Oct. 21, 1958 J. G. BAKER 2,856,877
HYDROFOIL SYSTEM FOR BOATS
Filed Nov. 4, 1955 11 Sheets-Sheet 1
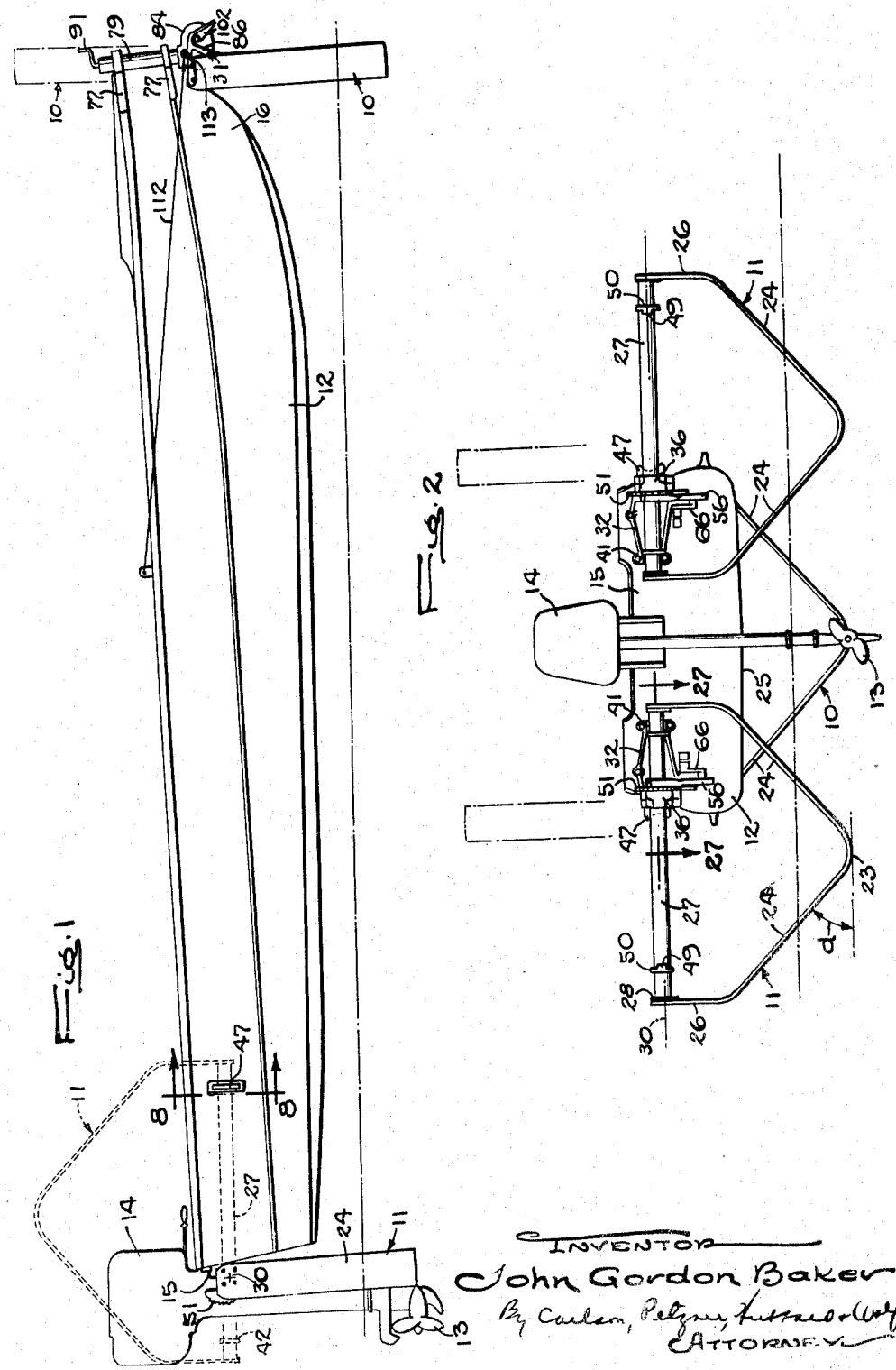
INVENTOR
John Gordon Baker
By Carlson, Pitzner, Hubbard & Wolfe
ATTORNEYS

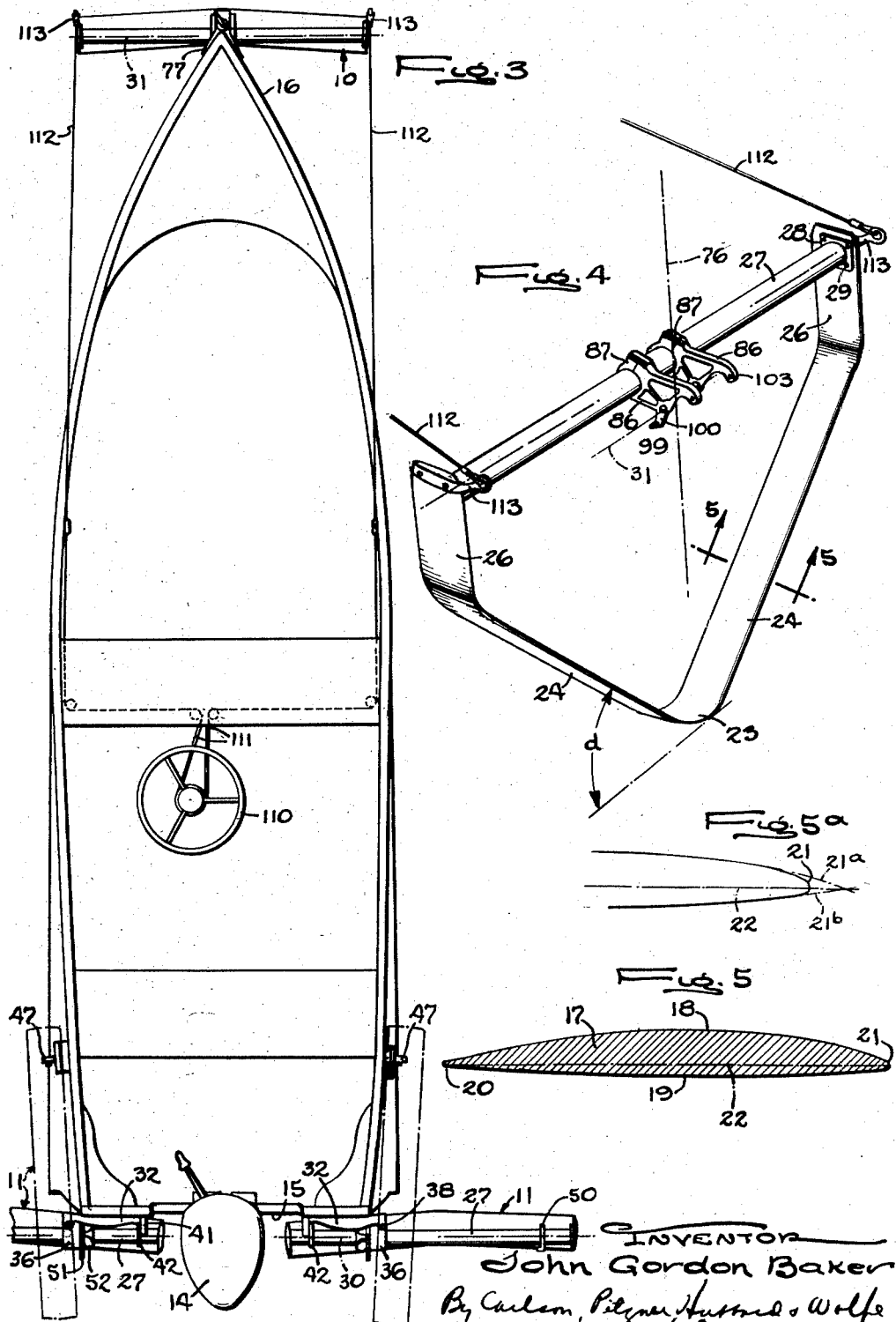

Oct. 21, 1958 — J. G. BAKER — 2,856,877
HYDROFOIL SYSTEM FOR BOATS
Filed Nov. 4, 1955 — 11 Sheets-Sheet 3
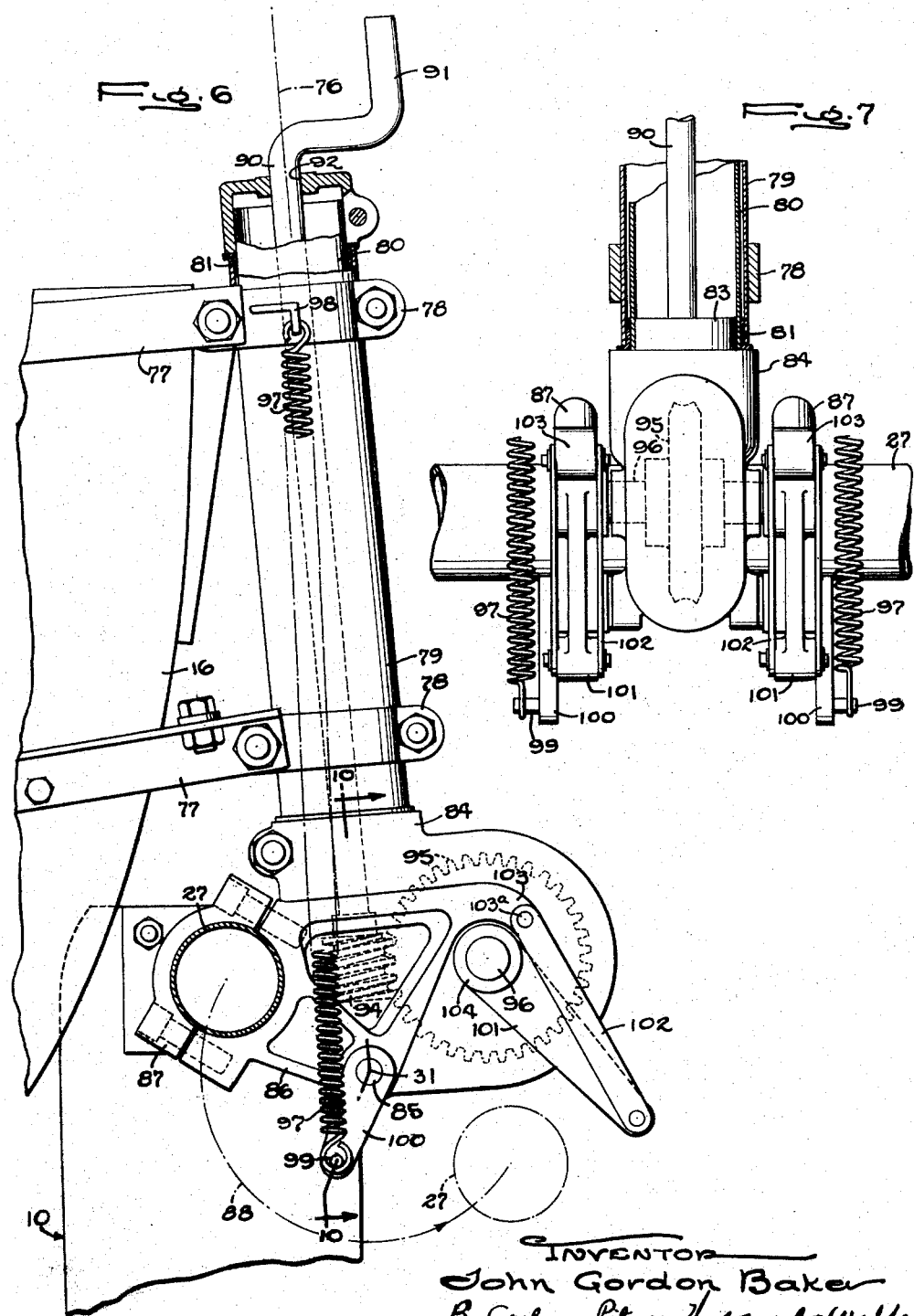

Oct. 21, 1958
J. G. BAKER
2,856,877
HYDROFOIL SYSTEM FOR BOATS
Filed Nov. 4, 1955
11 Sheets-Sheet 4
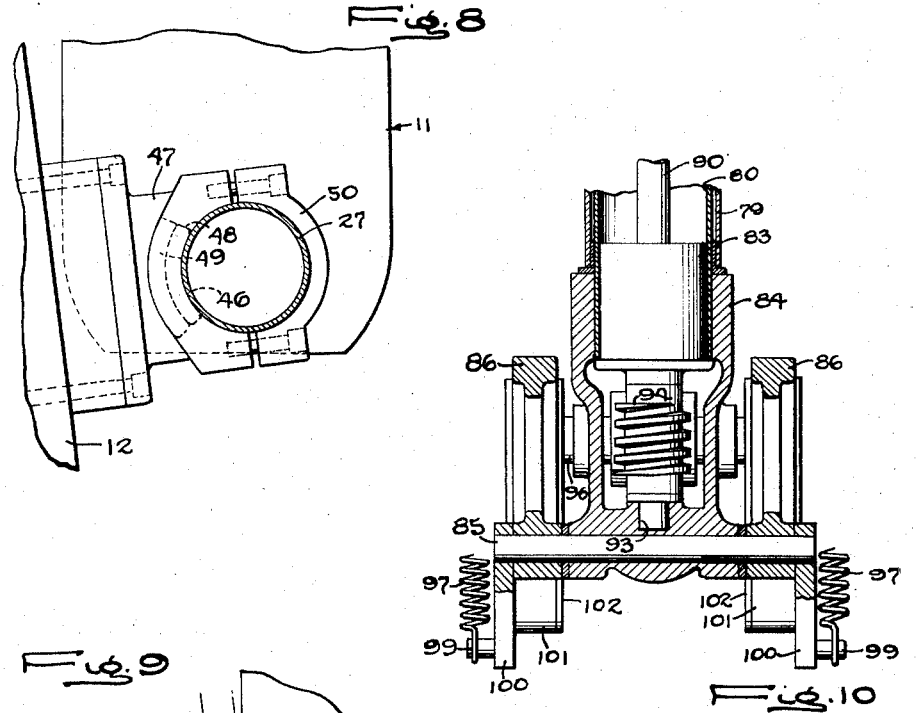
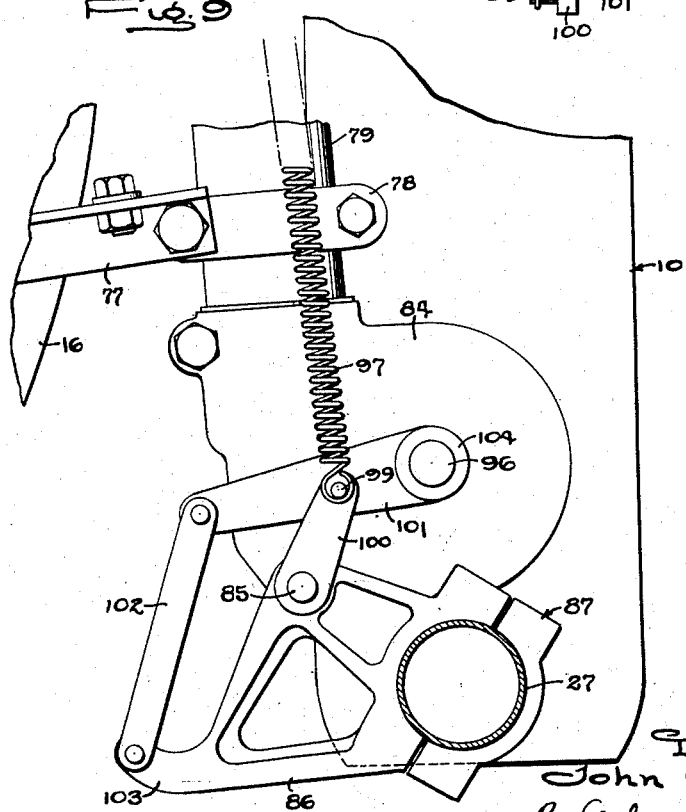
INVENTOR
John Gordon Baker
By Carlson, Pitzner Hubbard & Wolfe
ATTORNEY

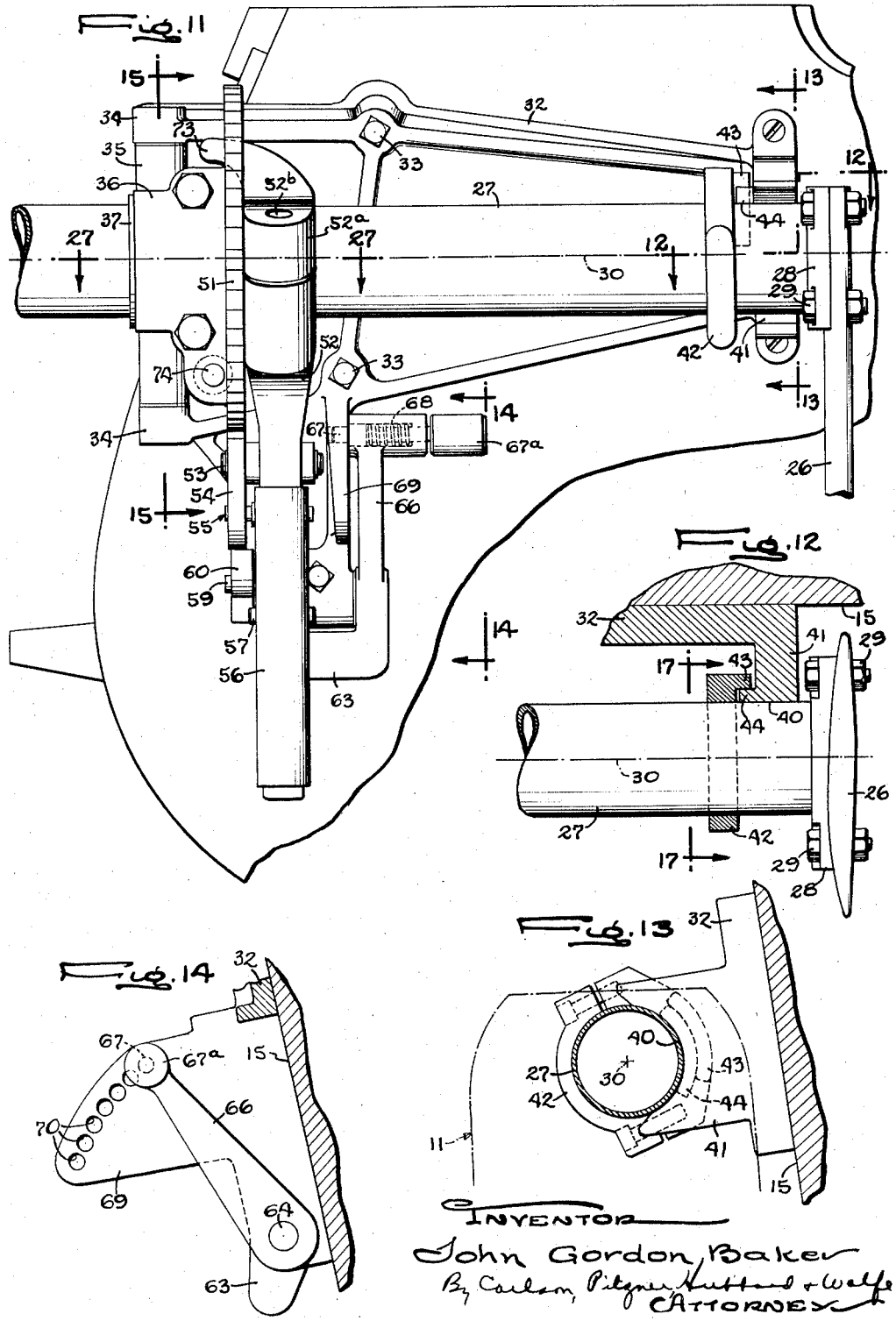

Oct. 21, 1958 J. G. BAKER 2,856,877
HYDROFOIL SYSTEM FOR BOATS
Filed Nov. 4, 1955 11 Sheets-Sheet 6
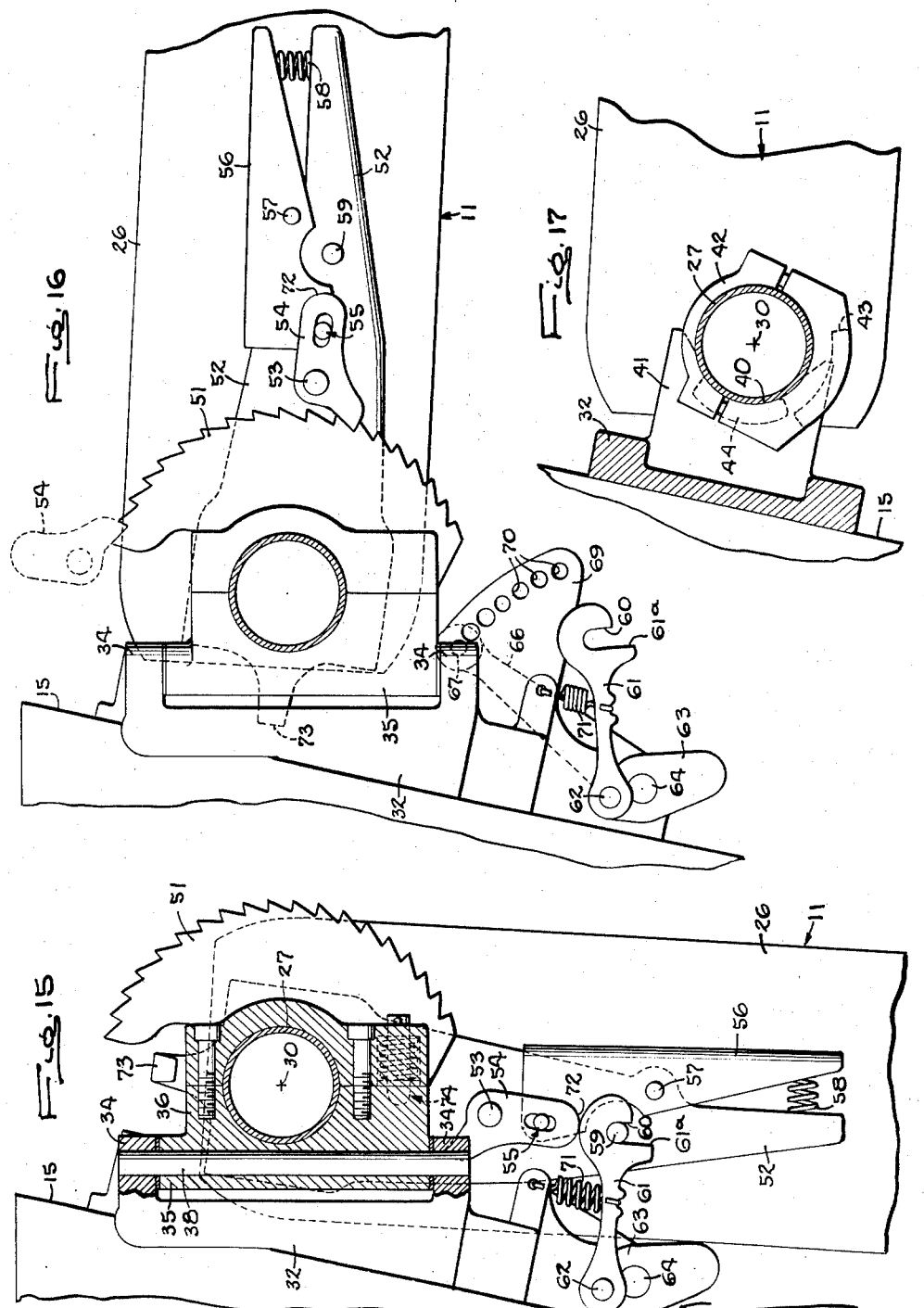
INVENTOR
John Gordon Baker
By Carlson, Pitzner, Hubbard & Wolfe
ATTORNEY Oct. 21, 1958   J. G. BAKER   2,856,877
HYDROFOIL SYSTEM FOR BOATS
Filed Nov. 4, 1955   11 Sheets-Sheet 7
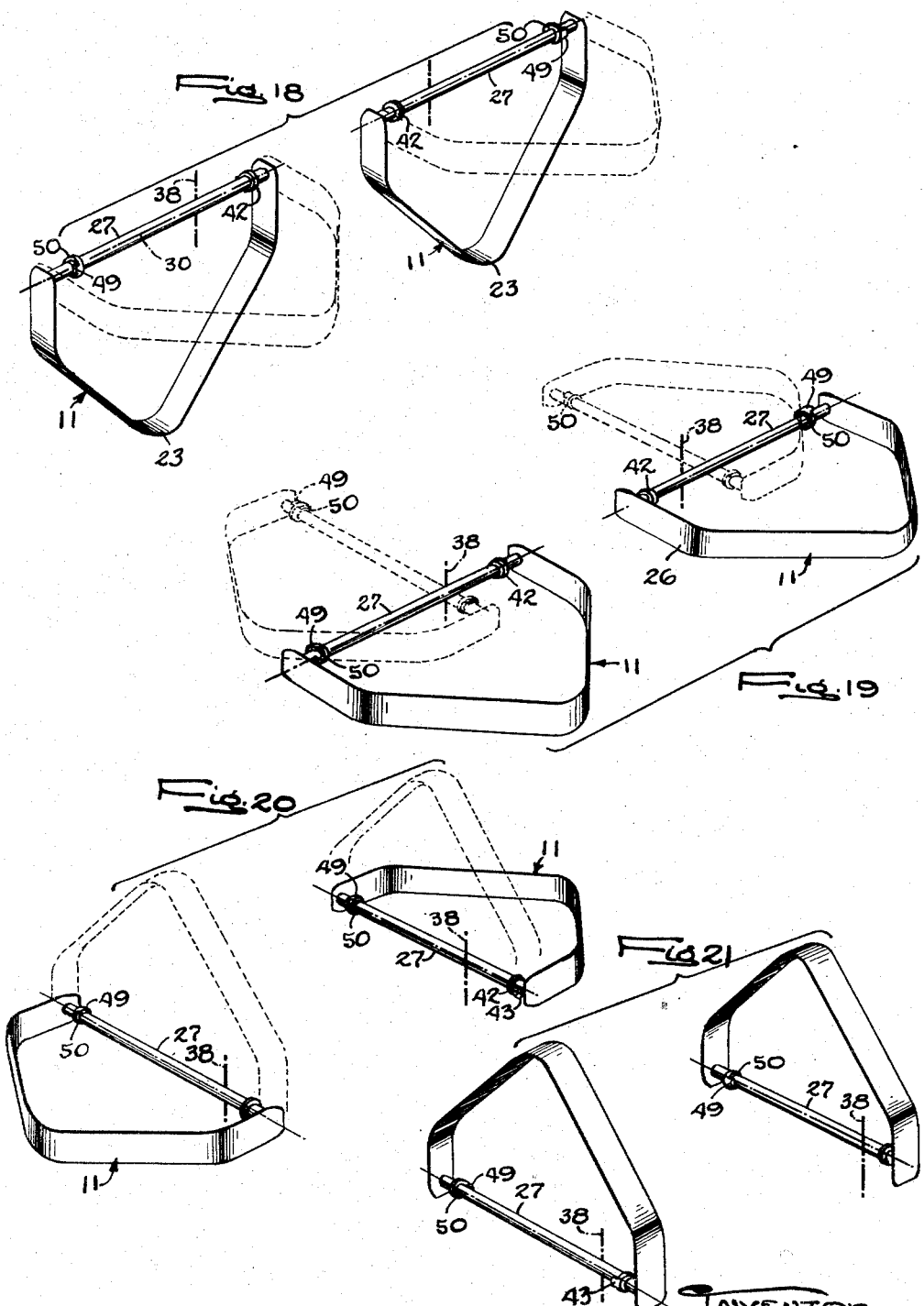

Oct. 21, 1958  J. G. BAKER  2,856,877
HYDROFOIL SYSTEM FOR BOATS
Filed Nov. 4, 1955  11 Sheets-Sheet 8
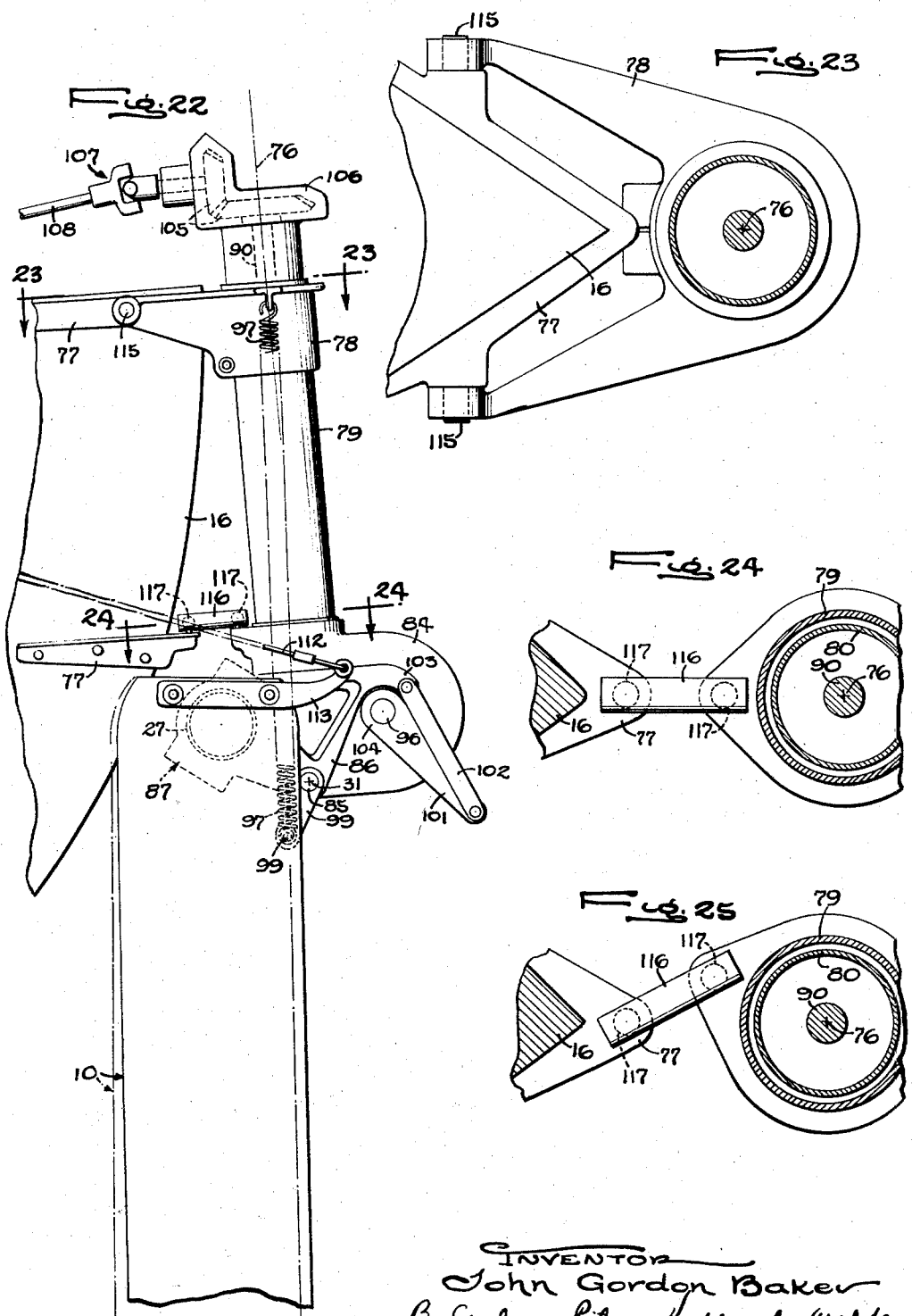

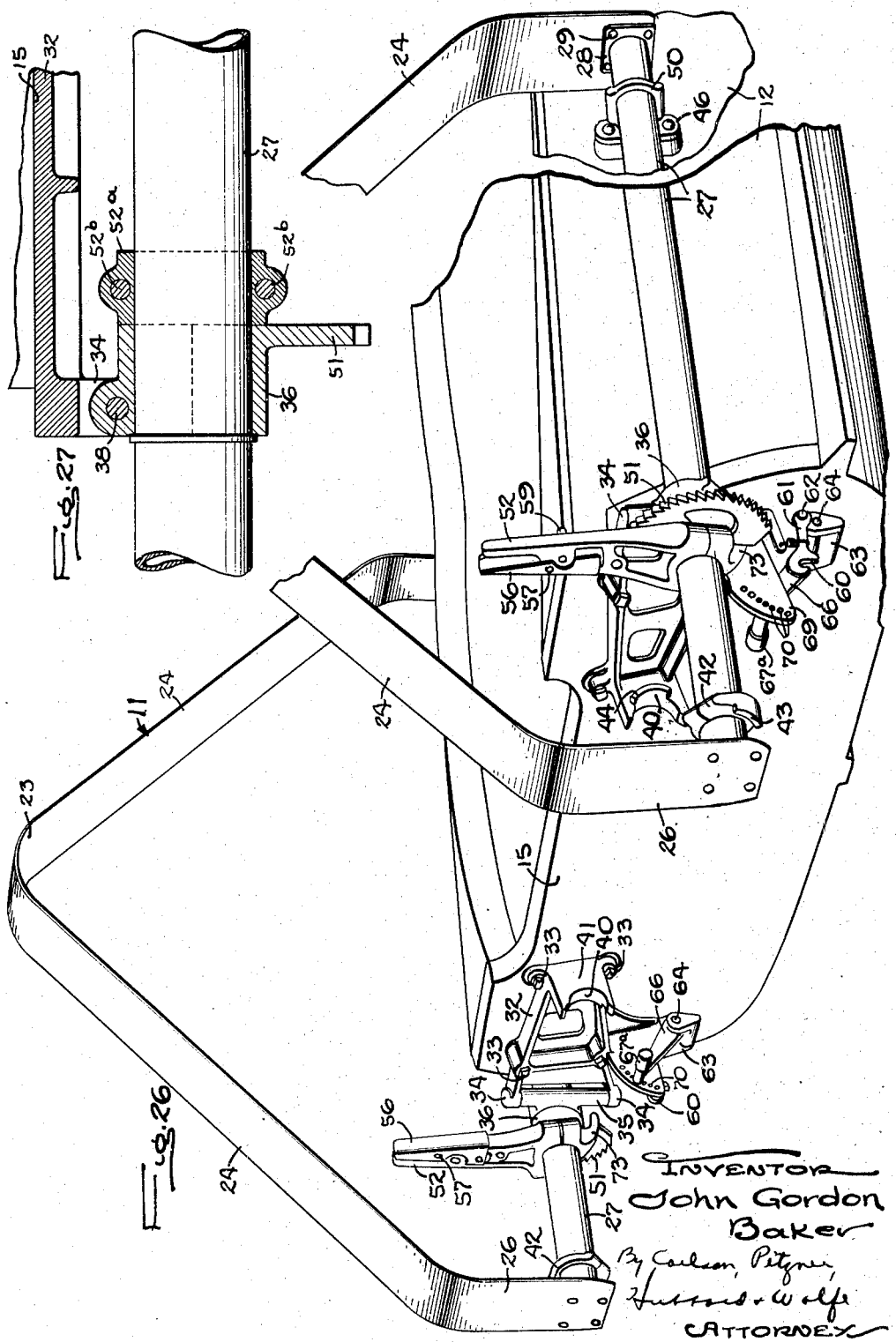

Oct. 21, 1958  J. G. BAKER  2,856,877
HYDROFOIL SYSTEM FOR BOATS
Filed Nov. 4, 1955  11 Sheets-Sheet 10
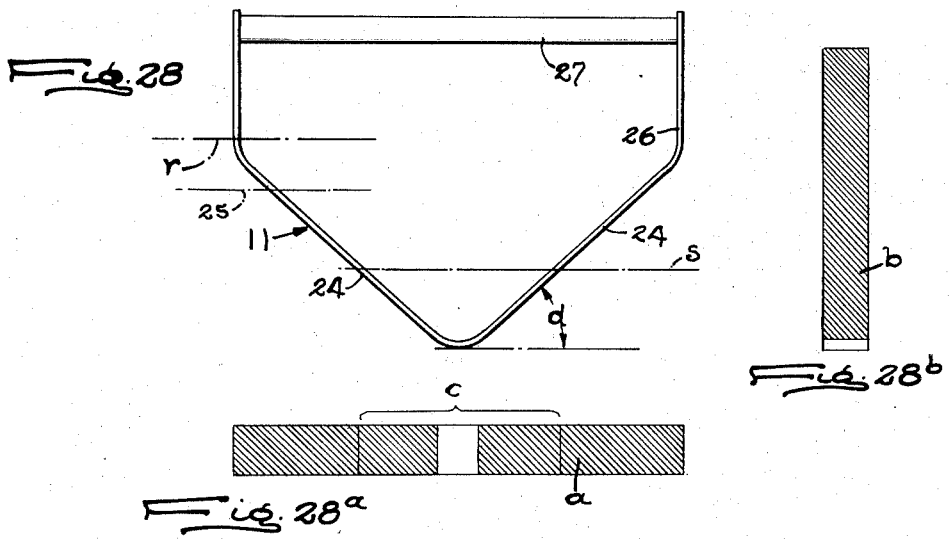
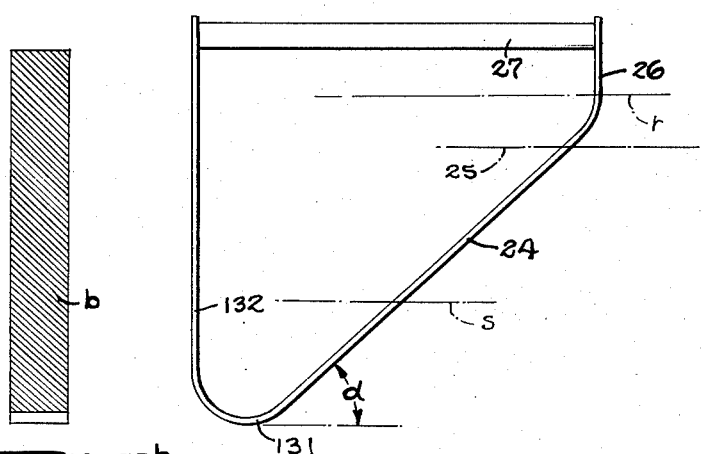
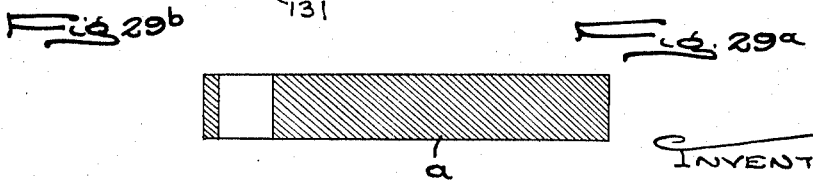
INVENTOR
John Gordon Baker
By Carlson, Pitzner, Hubbard & Wolfe
ATTORNEYS

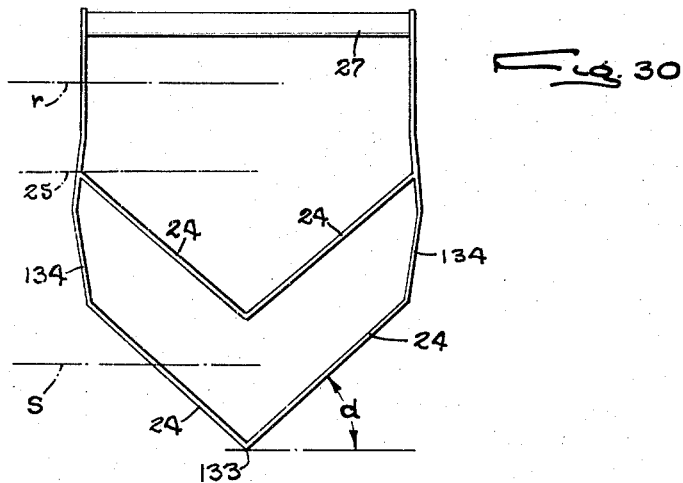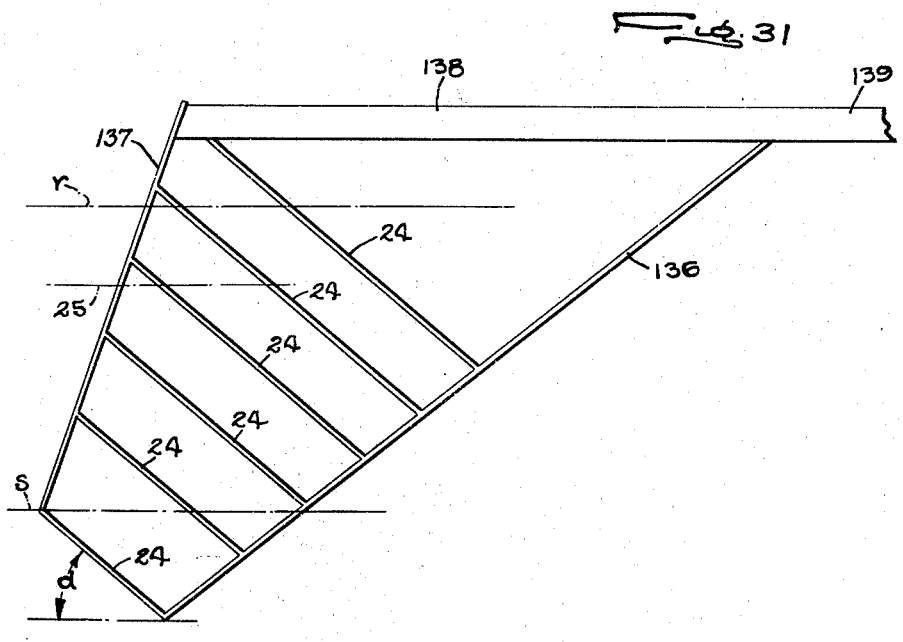

United States Patent Office 2,856,877
Patented Oct. 21, 1958

2,856,877

HYDROFOIL SYSTEM FOR BOATS

John Gordon Baker, Evansville, Wis.

Application November 4, 1955, Serial No. 544,865

39 Claims. (Cl. 114—66.5)

This invention relates to high lift-drag ratio elements or so-called hydrofoils which are mounted on the hull of a boat and operate by forward motion of the boat to raise the latter in the water and support all or part of the weight of the boat.

The general objects are to provide a hydrofoil system which is substantially more stable than prior systems particularly in operation in rough water or in maneuvering of the boat, which facilitates beaching of the boat or traveling in shallow water, which is less vulnerable to weeds and under water debris, which is mountable on standard boat constructions, which is adapted readily for overland transportation of the boat, and which is applicable easily and at low cost to conventional boat constructions.

A primary object is to provide a low drag hydrofoil system of sufficiently high stability for practical use either in waves or smooth water and on various kinds of boats.

A further object is to provide a hydrofoil element having a substantially larger dihedral angle than has been considered practicable heretofore.

Another object is to mount the hydrofoils on a boat in a novel manner such as to permit ready retraction thereof to inactive and out-of-the-way positions.

A more detailed object is to provide a multiple hydrofoil system in which the weight of the boat is distributed substantially equally between the several hydrofoils and stability of operation is achieved by a novel arrangement and wide spacing of the hydrofoils both laterally and longitudinally of the boat, there being two hydrofoil units laterally spaced apart and disposed at one end of the boat.

A further object is to provide a novel mounting which not only facilitates retraction of the foil to an inactive position but also permits adjustment of the effective angle of the foil when in active position.

Another object is to provide for adjusting the angle of attack of a hydrofoil element by the same mechanism which is utilized to raise and lower the element out of and into the water.

Another object is to provide a hydrofoil system which is capable of sustaining higher side loads and rolling moments than prior systems.

Another object is to provide a hydrofoil system which permits comparatively sharp turns to be made at high speed with only a small loss of forward momentum and without sacrificing good steering control.

Another object is to provide a low cost hydrofoil system suitable for attachment to certain types of popular boats already in existence.

The invention also resides in the novel construction of the hydrofoil to facilitate economical manufacture.

Other objects and adavntages of the invention will become apparent from the following detailed description taken in connection with the accompanying drawings, in which:

Figure 1 is a side elevational view of a motorboat equipped with a hydrofoil system embodying the novel features of the present invention.

Fig. 2 is a rear view.

Fig. 3 is a plan view.

Fig. 4 is a fragmentary perspective view of the front hydrofoil.

Fig. 5 is a cross section taken along the line 5—5 of Fig. 4.

Fig. 5a is a fragmentary view of a part of Fig. 5 with the arcs forming the foil surfaces extended beyond the leading foil edge.

Fig. 6 is a fragmentary side elevational view of the front hydrofoil and its mounting, certain of the parts being broken away and shown in section.

Fig. 7 is a fragmentary front view of the front hydrofoil mounting with certain of the parts broken away and shown in section.

Fig. 8 is a fragmentary sectional view taken along the line 8—8 of Fig. 1.

Fig. 9 is a view similar to Fig. 6 but showing the parts in foil retracted position.

Fig. 10 is a fragmentary sectional view taken along the line 10—10 of Fig. 6.

Fig. 11 is a fragmentary elevational view of one of the rear hydrofoils mounted on the boat.

Figs. 12, 13, 14 and 15 are fragmentary sectional views taken respectively along lines 12—12, 13—13, 14—14, and 15—15 of Fig. 11.

Fig. 16 is a view similar to Fig. 15 with the parts in a different position.

Fig. 17 is a fragmentary sectional view taken along the line 17—17 of Fig. 12, with the parts in a position different than in Fig. 13.

Figs. 18 through 21 are perspective views of the rear hydrofoils illustrating the different positions thereof.

Fig. 22 is a fragmentary side elevational view of the front hydrofoil and its mounting and showing a modified form of elevating mechanism.

Fig. 23 is a sectional view taken along the line 23—23 of Fig. 22.

Figs. 24 and 25 are fragmentary sectional views taken along the line 24—24 of Fig. 22 and showing the parts in different positions.

Fig. 26 is a fragmentary perspective view of the stern of the boat with the hydrofoils in retracted position.

Fig. 27 is a fragmentary sectional view taken along the line 27—27 of Fig. 11.

Fig. 28 is an elevational view of one of the hydrofoils shown in Figs. 2, 4, 18, and 26.

Fig. 28a is a projection of the active portion of the hydrofoil shown in Fig. 28 on a horizontal plane, the projected area of the foil having a dihedral angle of more than 35 being shaded.

Fig. 28b is a projection of the hydrofoil on a vertical plane with that part having a dihedral angle of more than 35 degrees indicated by shading.

Figs. 29, 30, and 31 are views similar to Fig. 28 showing modifications of the hydrofoil unit.

Fig. 29a is a view similar to Fig. 28a but corresponding to the hydrofoil shown in Fig. 29.

Fig. 29b is a view similar to Fig. 28b but corresponding to the hydrofoil shown in Fig. 29.

For purposes of illustration, the improved hydrofoil system comprising a plurality of foil units 10 and 11 is applied to a boat 12 having a square stern and adapted to be moved through the water by suitable means such as a sail or, as shown, by a single screw 13 located on the longitudinal center line of the boat and disposed below the lowermost part of the hydrofoils so as to be submerged to the proper degree in all vertical positions of the boat. The screw may as shown be driven from a suitable power source such as an outboard motor 14 secured in the usual way to the flat transom 15. The hydrofoils are located on the boat hull at points spaced as far apart as possible both laterally and longitudinally and arranged to sustain substantially equal parts of the boat's weight. For boats of the type disclosed, three of the foil units will suffice, one indicated at 10 being mounted at or outwardly beyond and centered relative to one end of the boat, in this instance the bow 16, while the two foil units 11 are disposed at opposite sides of the other end of the boat, in this instance the stern, these units preferably being secured to the transom 15. The front and rear hydrofoil units are spaced as far as practical and preferably equidistantly forwardly and rearwardly from the center of gravity of the boat and two of the units are spaced transversely of the boat and disposed outwardly beyond opposite sides thereof.

In this active position, each hydrofoil unit projects well below the bottom 25 of the boat and is disposed in a plane extending transversely of the boat. The foil units are constructed to present a lifting surface which is relatively large when the boat is resting on the water and that portion of the hydrofoil below the water level $r$ is submerged. The lifting surface decreases progressively in area as the boat rises to normal operative or flying position above the water which is then at the level $s$. During such flying, the effective lifting area changes rapidly when waves are encountered and the water surface rises and falls relative to the boat.

In the form shown in Figs. 1 to 26, the foil units 10 and 11 are identical in construction and preferably bent from an extruded metal bar 17 of suitable uniform foil cross section which may be the same throughout the active portion of the foil. One suitable section is that known in the aircraft art as N. A. C. A. 16–510. Or the section may be shaped as shown in Fig. 5 having an upper surface 18 of the foil of somewhat greater curvature than the under surface 19, the two surfaces intersecting at a relatively sharp trailing edge 20 which may be the actual intersection of the circular arcs on which the upper and lower surfaces are formed. For a purpose to appear later, the leading edge 21 is less slender than the section which is indicated at 21$^a$ in Fig. 5$^a$ and which would be formed by extension of the two arcs to a point of intersection 21$^b$. That is to say, the upper and lower lines defining the foil cross-section depart from the circular arcs near the edge 21 and curve inwardly more sharply so as to dispose the rounded edge surface of the foil wholly within the arc extensions 21$^a$. Thus, the edge 21 terminates a substantial distance short of and is spaced inwardly from the point 21$^b$, the inward spacing being about 1/20 the width of the foil section. Preferably, the maximum thickness substantially at the center of the foil is about 1/10 the length of the chord 22.

Variation of the active foil area according to the degree of submergence is achieved by constructing and mounting the foil unit so that in its active position one or more parts or elements 24 will be inclined relative to the horizontal. These inclined elements 24 may be differently arranged singly or in multiple as shown in Figs. 4, 29, 30, and 31.

In the preferred form (Figs. 2, 4, 18, 26, and 28) for use on power propelled boats, there are two inclined elements or legs 24 on each hydrofoil unit, these being arranged to form a V having a rounded apex 23 from which the legs 24 diverge upwardly along tangents to the apex at least to the level of the boat bottom 25 (see Figs. 2 and 4). The radius of the bend 23 is proportional to the length of the chord 22 so as to avoid any substantial change in the cross section of the bar at any point along the bent area. It has been found that this may be achieved by making the radius of the bend on the inside of the foil about three-fourths of the length of the chord 22.

The vertical height of the V is proportioned in accordance with the desired depth of submergence of the foil unit when the boat is floating idly. Beyond the upper ends of the legs 24, the end portions 26 of the legs of the V are bent into parallelism and, at the extreme ends, are spanned by and attached rigidly to opposite ends of a cross bar in the form of a tubular shaft 27. The attachment may be through the medium of flanges 28 (Figs. 4 and 12) encircling and welded to the tube and clamped by bolts 29 against the inner sides of the bar. The V-shaped bar and the connecting tube 27 thus form a rigid open frame structure with no cross-struts, joints or other underwater parts not contributing to the lifting effect in operation of the boat. By making the out of the water parts 26 parallel, the horizontal width of the foil is reduced to a minimum and the rigidity increased accordingly.

The acute angle $d$ included between the outer surface of one of the hydrofoil legs 24 and a horizontal plane may be referred to as the dihedral angle. It has been found that when this angle is, over a substantial portion of the foil, increased well beyond the value heretofore considered feasible, it coacts in a novel manner to be described later with the foil section above described and other conditions to obtain the desired stability in the operation of the boat under widely varying operating conditions. To this end, the angle is made greater than 35 degrees and preferably is about 42 degrees as shown.

Other forms which the hydrofoil may take while retaining the characteristics above described are shown in Figs. 29 to 31. In the case of boats where it is desirable to provide separate foil units on opposite sides of the bow, the overhang may be reduced by bending the bar of the foil section above described into the shape shown in Fig. 29. Only one of the inclined elements 24 is employed in each foil unit. This element merges at a bend 131 with an upright leg 132 which is straight and disposed in a vertical plane in the active position of the foil. As before, a short extension 26 of the bar at the upper end thereof is bent into parallelism with the leg 132, the two ends being secured to opposite ends of the cross-shaft 27.

To increase the effective area of the hydrofoil for initially lifting the boat from the water while at the same time maintaining the desired high dihedral angle $d$, more than two of the inclined foil elements 24 may be employed in each foil unit and arranged one above the other. In the form shown in Fig. 30, there are four such elements 24 arranged in pairs with the elements of each pair joined at an apex 133 and diverging upwardly to form a V. The two V's lie in a common plane and are spaced apart vertically. The outer ends of the elements of the lower V may be integral with the lower ends of upright substantially parallel side legs 134 joined at their upper ends as by a cross-shaft 27 through which the foil may be mounted on the boat hull. The upper one of the V's spans the uprights 134, its outer ends being suitably welded to the uprights. In this instance, the apex of the upper V is disposed substantially at the level of the outer ends of the elements 24 of the lower V. The foil unit thus constructed is mounted on the boat so as to be submerged to the line $r$ when the boat is resting on the water and to the line $s$ when the boat has been raised to bring the bottom 25 above the water surface.

The number of the inclined elements 24 incorporated in each foil unit and contributing to the lifting force as the boat is started in motion may be further increased by arranging the elements as shown in Fig. 31. In this instance, six straight elements of the foil cross section above described are inclined at the desired high dihedral angle $d$ although a smaller dihedral may be used for the upper elements of the unit so long as more than half of the horizontal projected area defined later has a dihedral of more than 35 degrees. The elements are arranged to form the cross-bars of a ladder having side bars 136 and 137. If desired, the bars 136 may also be made of the foil section above described, at the required high dihedral angle, since it is disposed so as to contribute to the lifting action the same as the bars 24. Opposite ends of each element 24 abut and are suitably welded to the bars 136 and 137. The upper end of the bar 137 abuts against and is welded rigidly to the outer end of a tubular crossbar 138 whose other end projects beyond the side bar 136 of the ladder and is welded to the upper end of this bar. The ladder type unit thus formed may be mounted on the boat hull through suitable means attached to the extended inner end portion 139 of the supporting bar 138. The ladder should be submerged about to the line r when the boat is resting on the water surface. Then, substantially the full lengths of the six elements 24 and the two side bars 136 and 137 are effective in producing the desired lifting effect as the boat starts to move through the water. When the boat becomes fully elevated above the water only those portions of the elements 24 and the bars 136 and 137 below the water line s will be submerged.

For the reasons explained in detail below, the extremely stable operation of a boat equipped with hydrofoils of the above character is attributable to the high dihedral angle d of the foil elements 24 and the maintenance, in the case of the front foil, of this high angle over the major portion of the foil areas which are submerged at any time.

The lifting force derived from a hydrofoil unit at any time corresponds to the projection of the active or submerged areas of its foil surfaces onto a horizontal plane. Such active areas in the case of the units shown in Figs. 28 and 29 are shown in Figs. 28a and 29a. The shaded portion in each of these figures is the active lifting area which acts with the desired high dihedral angle of over 35 degrees. Thus, with a hydrofoil constructed as shown in Figs. 2 and 28, about 91 percent of the total horizontal projected active area operates at a dihedral angle of more than 35 degrees when the hydrofoil is submerged to the line r. With the boat operating in still water and the water level at the line s, well over half of the horizontal projected active area has a dihedral of over 35 degrees as indicated by the shading within the area c.

As shown in Figs. 29a and 29b, the proportion of high dihedral area is somewhat reduced in the unit shown in Fig. 29 while in the units shown in Figs. 30 and 31, all parts of the horizontal projected area of the foils act at the high dihedral.

In a similar way, the ability of the hydrofoil to resist side thrusts and prevent rolling of the boat is determined by the active area as projected on a vertical plane as shown in Figs. 28b and 29b. In each of these instances, the high dihedral angle is used over the major portion of the active areas.

In accordance with another aspect of the invention each of the hydrofoils is mounted on the boat hull for movement between an active submerged position as shown in Figs. 1 and 2 and an inactive or retracted position as shown in phantom in Fig. 1 in which the entire foils and their mountings are disposed above the water surface r when the boat is floating thereon. Preferably, the retraction is effected by swinging the foils outwardly and upwardly about horizontal pivotal axes 30 and 31 (Fig. 1) extending transversely of the boat so that the same motions may be utilized to adjust the angle of attack of the submerged foils, that is, the inclination of the lower foil surface relative to the horizontal.

In the case of the rear foils 11, the pivotal mounting includes a bracket 32 (see Figs. 11 to 17, 26, and 27) in the form of a casting secured as by bolts 33 against the back of the transom 15 near one side thereof. The outer end of the bracket is bifurcated and the widely spaced arms 34 straddle a tubular flange extension 35 cast integral with a bearing ring 36 (Figs. 11, 26, and 27) encircling the foil shaft 27 near one end thereof and abutting at one end against a snap ring stop 37. The extension 35 is offset from the foil shaft 27 and extends transversely of the latter, being pivotally supported on the bracket 32 by a pin 38 spanning the arms 34 and extending through the ring extension 35. Thus, the foil is journaled on the bracket 32 to swing about the horizontally disposed axis of its shaft 27 and also about a vertical axis defined by the hinge pin 38. Since the latter is disposed between the foil shaft and the bracket 32 and at the outer end of the latter, the foil may be swung outwardly and around the outer end of the transom 15 and brought to an out of the way position along the side of boat as shown in Fig. 26 and in phantom in Fig. 1. At the same time, the foil, if in active or submerged position, may be swung in its bearing 36 outwardly and upwardly out of the water and into a vertical plane as shown in Fig. 26, the apex of the V-shaped foil then pointing upwardly.

In order to space the active or apex portion of the hydrofoil outwardly beyond the wave formed by the propeller 13, the bearing ring 36 is spaced outwardly from the longitudinal center of the shaft 27. Additional support for the shaft is provided by a half bearing 40 on the outer end of a flange 41 (Figs. 2, 11 to 13, and 26) integral with the inner end of the bracket 32 and projecting rearwardly therefrom. The bearing receives the end portion of the shaft of the foil when the latter is swung about the pivot 38 and toward the transom 15 to a position parallel thereto.

To hold the foil shaft seated in the bearing 40, a collar 42 clamped rigidly to the shaft adjacent the bearing is formed with a laterally projecting arcuate lug 43 which is adapted to interlock as shown in Fig. 13 with a similar arcuate lug 44 formed on the flange 41 alongside the bearing 40. The lugs are angularly located on the shaft 27 and the flange 41 in positions such as to be spaced apart angularly as shown in Fig. 17 when the shaft 27, with the apex of the foil in raised position, is swung toward and seated in the bearing 40. Then, as the shaft is turned to lower and submerge the foil, the lug 43, being spaced slightly farther from the shaft center than is the lug 44, will be swung upwardly and in behind the lug 44 and will fully overlap the latter as shown in Fig. 17 when the foil is in active position and in a substantially vertical plane. By closely fitting the engaging surfaces of the lugs, a very rigid but nevertheless detachable connection is formed.

It will be observed that the locking action takes place automatically as an incident to lowering the foil to active position. Conversely, unlocking of the foil shaft from the bearing 40 occurs automatically as the foil is swung upwardly and out of the water.

Similarly acting means is provided for securing the opposite end of the foil shaft 27 to the side of the boat when the foil is swung to the carrying position alongside the boat with the apex 23 projecting upwardly. Accordingly, half bearings 46 (Figs. 1, 3, 26, and 8) are mounted on the side walls of the boat hull and spaced forwardly from the transom to receive the ends of the shafts 27 opposite the collars 42. These bearings are on brackets 47 bolted to the boat hull and each has a laterally projecting lug 48 adapted to interlock with a similar lug 49 on a collar 50. The latter is clamped to the shaft in an angular position such that the lugs 48 and 49 are angularly spaced apart when the foil apex is submerged or projecting horizontally as shown in Fig. 20. The lug 49 moves downwardly and in behind the lug 48 to the overlapping position shown in Fig. 8 in the upward swinging of the foil to upright or carrying position in which the forward end of the foil shaft is locked securely to the boat hull.

The foils may be held in fully or partially raised position by individual latch mechanism each including a toothed segment 51 (Figs. 2, 11, 15, 16 and 26) partially encircling the foil shaft 27 and rigid with the bearing support 36 so as to swing with the latter and the foil about the hinge 38. Encircling the shaft 27 adjacent the segment 51 is a split ring 52a (Figs. 11 and 27) frictionally clamped to the shaft by screws 52b and having a radially projecting arm 52 whose outer end portion forms a handle for turning the foil in its bearings. Fulcrumed at 53 and intermediate its ends is a latch 54 having a pin and slot connection 55 with a lever 56 fulcrumed at 57 on the arm 52 and urged into latch-engaging position (Fig. 15) by a compression spring 58. By pinching the outer ends of the arm 56 and the lever together, the latch is retracted away from the teeth of the segment 51 thus permitting the arm 52 to be used as a handle to rock the foil shaft into any desired position. Thus the foil may be latched in a horizontal position above the water surface as shown in full in Fig. 16 or in a vertical position as shown in the phantom position of the latch (Fig. 16). This position is determined by engagement of a projection 73 (Figs. 11, 15 and 16) with a spring cushioned stop 74 on the bracket 32. The spring pressure holds the latch dog 54 against a tooth of the segment 51 thus avoiding rattling of the retracted foil during transportation of the boat overland. Swinging of the arm 52 downwardly to the vertical position shown in Fig. 15 carries the latch out of the range of the teeth on the segment 51. In all other positions of the foil, the latch 54 is engageable with a tooth of the ratchet 51, and such engagement takes place automatically whenever the arm 56 is released. Inadvertent dropping of the foil during its manipulation to and from active position is thus avoided.

Means is provided for locking each foil 11 in its active or submerged position while at the same time providing for adjustment of such position to vary the effective angle of attack of the foil. Herein, this means includes a pin 59 (Figs. 11, 15, 16 and 26) projecting laterally from the arm 52 outwardly beyond the latch 54 and adapted for engagement by a downwardly opening hook 60 on the end of an arm 61 projecting rearwardly from the boat transom and pivoted at 62 on the forward end of an arm 63 fast on one end of a rockshaft 64 which is journaled in a downward extension of the bracket 32. Secured to the other end of the rockshaft is an arm 66 carrying a cross pin 67 (Figs. 11, 14, and 26) which has a knob 67ª on its outer end and is urged by a compression spring 68 toward a plate 69 having an arcuate row of holes 70 therein to receive the pin in different angular positions of the arm 66 and therefore different horizontal positions of the hook 60. A contractile spring 71 urges the locking arm 61 upwardly tending to hold the hook in released position. However, when the arm 52 is swung downwardly with the latch 54 in retracted position the pin 59 moves into the recess of the hook and against the longer wall 61ª thereof. Then, when the lever 56 is released swinging the latch to the position shown in Fig. 15, the end 72 of the latch engages the upper side of the hook thus positively locking the hook against release from the pin. The foil is therefore locked against turning in its mounting except by overcoming the friction exerted on the shaft 27 by the clamping ring 52.

To adjust the pitch angle of the foil, the cross pin 67 is retracted out of the plate 69 and the arm 66 is swung to the desired position after which the pin is released and allowed to enter a new hole 70 in the stationary plate 69. The horizontal position of the hook 60 and therefore the angle of attack of the foil may be adjusted in this manner either before or after lowering of the foil into submerged or active position.

The various positions of the rear foils 11 when mounted as above described are shown in Figs. 18 to 21. In the active or fully submerged position shown in Fig. 18, the foils are disposed substantially in vertical planes depending on the adjustment of the locking hook 60 and the two foils are laterally spaced apart across the transom of the boat with their active positions or apices out of the wake normally formed by the boat propeller. At this time, the foil shafts are locked rigidly in the axially spaced bearings 36 and 40 and the pitch angle is determined by the setting of the cross pin 67 in the plate. To prepare the boat for traveling in shallow water or for beaching, the levers 56 are moved to retract the latches away from the hooks 60 thus releasing the latter for upward movement by the springs 71 as shown in Fig. 16. This releases the pins 59 so that the foil may, by raising the arms 52 upwardly to the horizontal as shown in Fig. 16, be bought into horizontal position (Fig. 19) in which the foils may be retained by releasing the latch levers 56. In this movement of the shafts 27, the lugs 43 are lowered out of engagement with the lugs 44 thus freeing the shafts 27 for horizontal swinging about the hinge pivots 38. While in this horizontal position, each foil is swung outwardly and around the corner of the transom 15 and then forwardly to a position alongside the boat as shown in Fig. 20, the shafts 27 then being seated in the side bearings 46. Finally and while the latches 54 are held retracted, the foils are swung to the vertical or carrying position shown in Figs. 21 and 26. In this movement, the lugs 48 and 49 interengage and the foils become locked when the hand levers 56 are released to allow the latches 54 to engage teeth of the segments 51.

The foils are usually raised into vertical position alongside the boat when the latter is being transported along a highway or when the boat is being brought alongside a pier. If the boat is to be beached or is approaching shallow water where it is desirable to retract the foils only temporarily, they may be swung upwardly into horizontal position as shown in Fig. 19 and later lowered into active or submerged positions.

Also, it should be noted that each hydrofoil 11 and the associated mounting, adjusting, and locking parts are carried by the bracket 32 and thus constitute a unitary assembly which may be attached readily and securely to parts of the transom 15 always accessible in standard boat designs and well adapted to support the foil with the necessary rigidity. Also, the handles 52, 56, and 66 by which the raising or lowering of the foils 11 are effected and the angle determine stop 61ª adjusted are disposed well above the water surface and readily accessible, both when the foils are submerged or retracted, to a person in the stern portion of the boat. The latch release lever 56 is mounted directly on the foil handle 52 so that the foil may be released from either position and moved to the other limit while manually grasping a single part. Locking the free end of the foil shaft 27 against the boat side or transom occurs automatically in the approach of the foil shaft to the new position. The same automatic locking occurs in the swinging of the foil to the preselected submerged position. As a result of this automatic action, bringing of the foils into and out of action is greatly facilitated thus simplifying the maneuvering of the boat under various conditions.

Mounting of the rear hydrofoils 11 to swing about horizontal axes extending transversely of the boat is also advantageous in avoiding damage in the event that the hydrofoils encounter underwater obstructions. For this purpose, the shaft 27 of each hydrofoil is, as described above, connected to its support through the clamp 52ª which is adjusted to impose enough friction on the shaft to hold the hydrofoil properly in active position. However, when an abnormal torque is applied as when the hydrofoil encounters an obstruction, the friction may be overcome allowing the foil to swing rearwardly and upwardly out of the way.

The front hydrofoil 10 is attached to the bow 16 of the boat and adapted for pivotal adjustment not only about the horizontal transverse axis but also about an upright axis 76 (see Figs. 3, 4, 5, 7, and 22) to enable the boat to be steered by swinging the foil horizontally about the latter axis. To these ends, vertically spaced brackets 77 are bolted to the sides of the bow 16 and their forwardly projecting ends 78 are clamped around opposite portions of a tubular casing 79 through which extends a tubular shaft 80. The latter is journaled in bushings 81 in the upper and lower ends of the casing and has a collar 82 fixed to its upper end and resting on the casing as shown in Fig. 6.

The lower end of the shaft 80 receives and is pinned or otherwise made rigid with a boss 83 (Fig. 7) on the upper end of a hollow casting 84. Pivot studs 85 defining the horizontal axis 31 project from opposite sides of the casting and support bell cranks 86 each having one arm secured to the hydrofoil shaft 27 by a screw actuated friction clamp 87. In the active or submerged position of the foil 10, the clamps 87 and the shaft 27 are disposed rearwardly from and somewhat above the pivot 31 as shown in Fig. 6. By swinging the cranks counterclockwise about the pivots 85 the hydrofoil shaft 27 will be swung bodily downwardly along the arcuate path indicated at 88 in Fig. 6, eventually reaching the position shown in full in Fig. 9. In this movement of the shaft through about a half revolution, the foil is moved from the vertical submerged position shown in Fig. 6 downwardly and outwardly and then swung upwardly out of the water and into the retracted upright position across the bow (Fig. 29).

As in the case of the rear foils 11, the friction clamps 87 permit backward swinging of the foil 10 when the latter is overloaded as by encountering an under the water obstruction. The background swinging is limited by the bow or keel of the boat which serves as a backing to increase the shock resistance of the foil.

To minimize the effort required to raise and lower the fail 10, the weight of the latter is counterbalanced by torque which changes with the movement of the foil and is greatest when the weight effect of the hydrofoil is a maximum. Herein, the counterbalancing torque is derived from contractile springs 97 (Figs. 6 and 29) stretched between abutments 98 near the upper ends of the bearing tube 79 and pins 99 carried by lugs 100 integral with the bell cranks 86 and projecting downwardly from the pivots 85 when the foil is in active position (Fig. 6). At this time, the line of action of the spring force is close to the pivots and very little torque is exerted tending to swing the bell cranks clockwise. As the bell cranks are turned counterclockwise to raise the hydrofoil out of the water, the line of action shifts across the pivotal axis 31 and the spring becomes effective to exert an upward force counterbalancing the weight of the foil. Such shifting of the spring continues through a quarter revolution of the bell cranks when the foil is disposed horizontally and the moment arm location is such as to give nearly the maximum spring moment.

Swinging of the foil 10 through a half revolution between active and retracted positions (Figs. 6 and 29) is effected by rotation of a shaft 90 preferably operable from a position within the boat and extending, in this instance, axially through the hollow shaft 79 for connection of its upper end with a crank 91 (Fig. 6) or other suitable operator. The shaft is journaled in bearings 92 and 93 and near its lower end carries a worm 94 meshing with a worm wheel 95 fast on a shaft 96 which projects through and is journaled in the opposite vertical walls of the casing 84. The shaft is spaced above and forwardly from the pivots 85 and crank arms 101 fast on the outer ends of the shaft 96 are pivotally joined through connecting rods 102 to the ends 103 of the bell cranks which, in the active position of the foil 10, overlie the shaft 96 substantially in contact with the hub 104 of the crank which may be utilized as a stop for limiting the clockwise swinging of the shaft and thus facilitate location of the foil 10 approximately in its active vertical position.

The operating connection between the foil 10 and the adjusting shaft 90 are so constructed as to operate with a relatively high transmission ratio during lowering and raising of the foil into and out of the water but with a very low ratio and high mechanical advantage at or near the active or vertical position of the foil and with the movement of the foil proportional to the movement of the adjusting handle throughout this adjusting range. This permits the use of a single operating connection for moving the foil between active and retracted positions and for effecting fine adjustments in the angle of attack of the foil as required by prevailing operating conditions. The proportional relation mentioned permits a linear interpretation of the adjusting angle position in terms of the angle setting of the foil or its weight sustaining capacity.

This proportional relationship is achieved by locating the centers 31, 96$^a$, and 103$^a$ along a straight line when the foil is in about the middle of the desired range of adjustment of the foil when it is in the active position shown in Fig. 6. At this time the ratio of the rotational movement of the foil 10 to that of the crank 101 is approximately the ratio of the distance between the centers 96$^a$ and 103$^a$ to the distance between the centers 31 and 103$^a$ (Fig. 6). One-quarter is a suitable value for this ratio so that a substantial angular movement of the shaft 96 is required to effect a small change in the angle of the foil. As the shaft 96 is turned counterclockwise rotating the foil out of the active range, the angular movement of the foil about the pivot 85 for a given increment of movement of the crank increases progressively. This increase in the ratio of transmission of the motion of the adjusting shaft 90 continues all the way to the fully retracted position of the foil shown in Fig. 9. Such decrease in mechanical advantage is permissible because the effort required to swing the foil into or out of the water is small as compared to the force necessary to change the foil angle in the course of operation or to withstand the frictional moment in an emergency when the foil slips in the clamps 87 as a result of striking an underwater object, such torques being large as compared to the torque required to hold the foil in active position during actual operation.

Location of the foil adjusting shaft 90 in upright position and extension thereof upwardly above the top of the bow enables the foil 10 to be raised and lowered and its effective angle of attack to be varied by manual effort applied by a person disposed within the boat. The shaft may be turned by the crank 91 or through an extension of the operating connection to any other convenient position within the boat. In the form shown in Fig. 22, such extension is achieved through the provision of meshing bevel gears 105 disposed within and journaled on a housing 106 on the top of the bearing tube 79. One gear is fast on the upper end of the shaft 90 while the other projects through the housing and is coupled, as by a universal joint 107 to a shaft 108 extending longitudinally of the boat to a suitable crank or hand wheel (not shown) located at any convenient operating point within the boat.

Owing to the outward and upward divergence of the two foil elements 24 and the large dihedral angles $d$ of these foil legs, the hydrofoil 10 possesses a high degree of directional persistence, that is, a marked tendency to move through the water in a direction perpendicular to the plane of the V which includes the axis of the supporting shaft 27. Advantage is taken of this characteristic to steer the boat when the latter is supported above the water surface by the hydrofoils 10 and 11. For this purpose, means manually operable from a position within the boat is provided for swinging the hydrofoil about its upright axis 76 (Fig. 4) which, in the case of one front hydrofoil is positioned to intersect the center line of the boat. Herein, this means includes a hand wheel 110 (Fig. 3) connected through a flexible cable 111 to the outer ends of shaft 27 of the hydrofoil 10. As shown, the cable is mounted on the boat hull for endwise movement, the center being attached to a drum on the hand wheel while opposite end portions 112 are extended along opposite sides of the boat and over the top of the latter to opposite ends of the foil 10 where they are attached to eyes on arms 113 upwardly inclined and attached to the upper ends of the foil legs 26.

In response to turning of the hand whel 110, the inclination of the plane of the foil 10 will be changed correspondingly relative to the longitudinal axis of the boat. Owing to its directional persistence characteristic, the foil tends to travel in a direction normal to this plane thus changing the direction of motion of the bow of the boat. By this action, it has been found that the direction of travel of the boat may be changed quite sharply without serious rolling or pitching of the boat. The rear foils 11 of course follow the changes in the direction of the travel of the front foil 10.

It will be noted that the axis 76 about which the foil 10 is swung to steer the boat is offset forwardly from the points of suspension of the foil when the latter is in operating position. With this arrangement, the side force component acting on the foil during the making of a turn tends to turn the foil to the straight ahead position. Therefore, it is unnecessary to hold the steering wheel for straight ahead travel.

If the steering axis is fixed with respect to the boat the small outward roll of the boat in turning introduces an unwanted increase in the angle of attack of the front hydrofoil. Referring to Figs. 22 and 25 this tendency may be compensated for by the automatic foil supporting bearing progressively as the foil is turned away from the straight ahead position. To this end, the forwardly projecting end portion 78 of the tube supporting bracket 77 is forked to straddle the bow 16 with its legs pivoted on horizontal studs 115 projecting outwardly from the upper bracket 77. The lower bow bracket 77 is joined to the gear casing 84 through a rigid link 116 having ball and socket connections 117 at opposite ends.

When the foil 10 is disposed in the straight ahead position, the link 116 will lie in a diametrical plane through the steering axis 76 as shown in Fig. 24 and the link connection will be of maximum effective length. At this time, the angle of attack of the foil 10 will be determined by the adjusted position of the bell cranks 86. Now if the foil 10 is swung clockwise about the axis 76 to steer the boat to the right, the link 116 will be inclined as shown in Fig. 25 resulting in a foreshortening of the link connection which is accompanied by slight rocking of the entire foil supporting assembly about the pivots 115 and toward the bow 16. The foil 10 is thus shifted bodily from the full line position (Fig. 22) to that shown in phantom thus decreasing the effective pitch angle of the foil and thus compensating for the unwanted increase in pitch angle due to the roll of the boat. A similar automatic compensation for the effect of the roll of the boat takes place in turning of the foil 10 to steer the boat to the left. At the lesser pitch angle, the forces acting on the foil and tending to produce lateral rolling of the boat will be correspondingly reduced. A similar tilting of the foil assembly takes place in response to turning of the foil 10 to steer the boat to the left. In each case, the original angle of the foil is restored as the foil is turned back to the straight ahead position.

The hydrofoil system above described overcomes one of the major difficulties inherent in prior systems. This difficulty is the dropping of the boat caused by the sudden loss of lift by at least one hydrofoil due to the breaking away of the water flow from the top surface of the hydrofoil thus destroying the vacuum essential to the maintenance of the lifting force. This phenomenon will be referred to as "separation drop."

The flow separation with separation drop can be observed as the formation of a large bubble or sheet of air over the hydrofoil at the instant when the drop occurs. Such air appears to enter the water at the intersection of the water and upper foil surfaces and to travel down along the latter surface. Separation drop may occur at any speed at which the hydrofoil is exerting appreciable lift. When it occurs at high speed with the boat clear of the water, the boat may drop all the way back to the water.

It has been observed that for a given hydrofoil configuration, separation drop is most apt to occur during operation at speeds below the speed at which the boat hull emerges from the water, during operation in waves, when some underwater obstruction such as a weed is carried along by the hydrofoil, with an excessively slender leading edge of the foils, as the lowest part of the hydrofoil approaches the surface, or when the angle of attack of a hydrofoil exceeds a certain limiting value. For convenience, this limiting value will be referred to as the "separation angle."

With the hydrofoil system above described, it has been found that a high separation angle is obtained and the danger of separation drop is substantially eliminated thereby making the system practicable for use under the widely varying conditions encountered in service use, particularly during operation in rough water. This desirable action is believed to be due to a unique coaction between (1) the cross-sectional shape of the hydrofoil as described above, (2) the high dihedral angle $d$ at the water surface, and (3) the extension of this high dihedral over the major portion of the active or submerged area of the foil.

As to the foil cross section, a hydrofoil having top and bottom surfaces formed by the intersection of two circular arcs has a relatively small separation angle. By altering the leading edge of this shape to make it less slender or more blunt as described above and shown in Fig. 5, it has been found that the separation angle can be increased substantially.

In considering the important factors (2) and (3) above, reference will be made to the following definitions.

"Active area" of a hydrofoil is the area which produces effective lifting action and is wetted in normal operation. This is the area below the water surface $r$ when the boat is floating idly and below the line $s$ to which the apex portion of the V is submerged when the boat is foil borne and moving through smooth water. In rough water, the water surface may rise along the foil elements all the way to the bottom 25 of the boat.

"Horizontal projected area" is the projection of the active area of the hydrofoil on a horizontal plane. For the condition of maximum submergence of the hydrofoil, this area is represented by the rectangles $a$ in Figures 28$^a$ and 29$^a$. At the normal submergence when the boat is flying, the horizontal projection of the active area is indicated at $c$ in Fig. 28$^a$.

"Vertical projected area" is the projection of the active area of the hydrofoil on a vertical plane paralleling the longitudinal axis of the boat. For maximum submergence of the hydrofoil, this area is indicated by the rectangles $b$ in Figs. 28$^b$ and 29$^b$.

The high dihedral angle incorporated in the hydrofoils above described contributes in various ways to the high stability achieved in the operation of the present system. First, the separation angle is increased and the danger of dropping of the boat correspondingly decreased by increasing the dihedral angle to a value greater than 35 degrees. This is because the susceptibility of air entry from the water surface is reduced progressively as the dihedral is increased. Then, since in rough water, the instantaneous water surface moves up and down over a large portion of the vertical height of the active area of the foil, the dihedral over a large portion of the vertical projected area must be large in order to avoid a low separation angle within any part of the range through which the water level varies relative to the foil. From Figs. 28$^b$ and 29$^b$, it will be observed that the high dihedral contemplated by the present invention is, as indicated by the shading of the area $b$, effective at all points along the foil elements 24 above the minimum water level $s$.

Secondly, the change in the angle of attack of the hydrofoil which accompanies the rise and fall of the water surface along the foil elements 24 is reduced by the high dihedral.

The change in the angle of attack of the foil for a given side force is largely dependent on the vertical projected area which is increased with increased dihedral, other factors remaining the same. Therefore, the larger the dihedral angle for the same horizontal projected area the smaller will be the change in angle of attack for a given side force and hence the smaller probability of separation drop occurring during turning of the boat.

Thirdly, the larger the dihedral for a given horizontal projected area the greater will be the draft and therefore the larger is the permissible water level variation with respect to the foil without uncovering the foil to the point where separation drop is likely to occur.

It will be observed that in order to insure against the danger of separation drop under the widely varying conditions of service use, the dihedral of the foil elements has been increased well beyond what has heretofore been through to be feasible. Such increase, however, has been limited so as to avoid the introduction of other difficulties including increased drag and detrimental sluggishness in following long waves. Therefore, a dihedral on front foils on the order of 40 degrees is preferred.

At the rear of the boat, a lesser stabilizing force will suffice. Here, however, a high dihedral of at least 35 degrees over all of the vertical projected area is desirable where, as in the forms disclosed, the active portions of the foil elements 24 pierce the water surface.

The high dihedral contemplated by the present invention may be employed without objectionable loss of roll stability of the boat. This is due to the use of at least three hydrofoils and the wide spacing thereof both laterally and longitudinally of the boat. Two of the foils are disposed on opposite sides of the boat at one end thereof so as to provide points of support spaced farther apart than the transverse width of the boat. The spacing of the foils longitudinally of the boat and as far apart as possible for a given length of boat also contributes to prevention of separation drop. This is particularly important where, as in certain types of boat, there are to be fore and aft weight shifts or other changes in the forces conducive to pitching of the boat.

The several hydrofoil units providing the multiple point support for the boat during flying may be arranged in other ways while maintaining the desired wide spacing of the support points both laterally and longitudinally of the boat. For example, two of the hydrofoil units may be mounted near the bow of the boat and spaced outwardly from opposite sides thereof, as shown in my application Serial No. 567,303, filed February 23, 1956. With front foils of this character, wider latitude is permitted in the number, type, and arrangement of the unit or units at stern.

From the foregoing, it will be apparent that by locating the foils near or beyond the stern and the bow of the boat in combination with the high dihedral and the foil cross-section mentioned above, variations in the angle of attack of each hydrofoil are effectually minimized and the danger of separation drop is thereby reduced.

These important advantages are achieved without the necessity of adding to the foil so-called fences which have been resorted to in some hydrofoil boats in an attempt to prevent separation drop with lower dihedral angles. Such fences not only add substantially to the drag of the boat but involve substantial complications in the foil construction.

The hydrofoil system as described above is also advantageous in greatly increasing the lift-drag ratio as compared to prior systems, this ratio being the weight of the boat in proportion to the force required to propel it forwardly after the boat has been lifted out of the water. With the described system this ratio may easily be increased to 15 which is far above that heretofore obtained on a comparable boat.

Operation

A small boat equipped with hydrofoils of the character described above may be carried overland on a truck or trailer when the foils are retracted for instance as shown in phantom in Fig. 1, the foils 11 lying along the sides of the boat while the front foil is swung upwardly over the bow. The foils are maintained in this position during launching of the boat and movement thereof out of shallow water. When the boat is stationary, it is submerged to a line somewhat above the bottom of the boat.

To lower each rear foil 11 to active position, the lever 56 thereof is moved to retract the latch 54 after which the handle 52 and the foil are swung downwardly to horizontal position (Fig. 16) thus releasing the shaft 27 from the half bearing 46. The latch is allowed to reengage the gear segment 51 to retain the foil in horizontal position (Fig. 20) while it is being swung a quarter revolution around the hinge pin 38 to seat the shaft 27 in the half bearing 40 as shown in Figs. 17 and 19. After again withdrawing the latch 54, the handle 52 is swung downwardly to the vertical position (Fig. 18), the pin 59 encountering the stop 61ᵃ of the hook whereupon the latch is released and allowed to move into blocking position against the hook 60 as shown in Fig. 15. The foil is thus locked in a vertical position and the effective angle of attack of the foil corresponds to the position of the adjusting pin 67 along the plate 69 (Figs. 11 and 14). The angle may thereafter be changed as desired by withdrawing the pin 67 and, after turning the arm 66 to the desired position, reentering the pin in another one of the holes 70.

The front hydrofoil 10 is lowered into active position by turning the shaft 108 (Fig. 22) in a direction to swing the bell cranks clockwise from the position shown in Fig. 9. This motion is continued until the foil reaches the vertical position (Figs. 6 and 22) after which the angle of attack may be changed as desired by turning the shaft 108 in the proper direction before or during forward propulsion of the boat.

With the three foils thus rigidly suspended from the boat with their apices 23 projecting downwardly and spaced well below the bottom of the boat, power is applied to the screw 13 to propel the boat forwardly along the water surface. Owing to the lifting properties of the foils, the boat rises gradually as the speed increases and eventually is elevated out of the water and supported solely by the lower end portions of the three hydrofoils. The time required to attain full height will depend on the weight of the loaded boat, and the angle of attack at which the hydrofoils are set, the angle usually being increased with the weight to be supported.

When the foil angles are adjusted properly in acordance with the prevailing load conditions, the boat will be disposed in a true horizontal position, and the weight will be distributed evenly between the three foils whose apices project only a short distance below the water surface as shown in Figs. 1 and 2. Steering of the boat along a desired course is effected by lateral swinging of the front hydrofoil in the manner described above.

This application is a continuation-in-part of my copending application Serial No. 260,614, filed December 8, 1951, and now abandoned.

I claim as my invention:

1. For use in a hydrofoil system, the combination of a bracket adapted to be secured to the hull of a boat, a member hinged on said bracket to swing about an upright axis adjacent one end of the bracket and carrying a bearing having a horizontal axis, a hydrofoil of foil cross section having laterally spaced legs and a shaft rigidly spanning the legs of said hydrofoil and journaled in said bearing, a half bearing on said bracket axially spaced from said first bearing and adapted to receive said shaft, and lugs rigid with said shaft and bracket respectively and normally disengaged when said hydrofoil is projecting outwardly from said bracket but interengageable in the movement of the hydrofoil into parallelism with the bracket to lock said shaft in said half bearing.

2. For use in a hydrofoil system, the combination of a bracket adapted to be secured to the hull of a boat, a member hinged on said bracket to swing about an upright axis adjacent one end of the bracket and carrying a generally horizontal bearing, a hydrofoil having a cross-shaft journaled near one end in said bearing, a half bearing on the other end of said bracket adapted to receive said shaft, and means operable automatically as an incident to swinging of said hydrofoil into and out of active position to lock said shaft in or release the same from said half bearing.

3. The combination of, a hydrofoil having a supporting cross-shaft, a support attachable to a boat, a member hinged on said support to swing relative thereto about an upright axis, a bearing on said member rotatably supporting one end portion of said shaft to turn about an axis extending transversely of said first axis, a second bearing alined with and axially spaced from said first bearing, and means detachably securing the other end portion of the shaft in said second bearing while permitting swinging of the shaft with said member.

4. The combination of, a boat, a hydrofoil, a support attachable to said boat, means on said support rotatably supporting said hydrofoil to swing into and out of an active submerged position about an axis extending transversely of the boat, a stop engageable with said hydrofoil to determine said active position, means on said support mounting said stop for adjustment to vary said active position and the angle of attack of the hydrofoil, and means releasably engageable with a part of said hydrofoil to hold the latter in said active position while engaging said stop.

5. The combination of, a support attachable to a boat, a hydrofoil mounted on said support to swing about a substantially horizontal axis extending transversely of the boat above the bottom of the latter and into and out of the water to and from an active position, a stop member mounted on said support engageable with a part rigid and movable with said hydrofoil to determine said active position, and means on said support selectively adjustable to vary the position of said stop member and thereby change the angle of attack of the active portion of said hydrofoil.

6. The combination of, a support attachable to a boat, a hydrofoil having an intermediate portion of foil cross-section and laterally spaced legs upstanding therefrom, mechanism on said support supporting said legs for movement of the hydrofoil between an active submerged position and a retracted out of the water position along one side of said boat, and means operable when said hydrofoil is in said submerged position to lock the same rigidly to said mounting.

7. The combination of, a support attachable to the boat near the bow thereof, a generally V-shaped hydrofoil, means on said support mounting said hydrofoil for swinging of the hydrofoil about a generally horizontal axis from a substantially vertical position into and out of the water position, an upright shaft journaled on said support, a connection between said shaft and said hydrofoil for swinging the latter in response to turning of the shaft, an operating shaft, and a connection between the upper end of said first shaft and the outer end of the operating shaft for extending the latter into the boat.

8. The combination of, a support attachable to the bow of a boat, a hydrofoil, a member mounted on said support to swing about a generally horizontal axis extending transversely of the boat to which said support is attached, connecting means between said member and said hydrofoil normally holding said hydrofoil rigid with said member but releasable under an overload to permit backward swinging of the hydrofoil about an axis paralleling said first axis and extending longitudinally of said bar, a shaft journaled on said support, and means connecting said shaft and said member and operable by rotation of the shaft to swing said hydrofoil between an active submerged position and a retracted out of the water position.

9. The combination of, a support attachable to the bow of a boat, a member mounted on said support to swing about a generally horizontal axis extending transversely of the boat to which said support is attached, a hydrofoil rigid with said member and swingable therewith between an active submerged position and an out of the water position, an upright shaft journaled on said support, and means connecting said shaft and said member for swinging of the latter back and forth about said axis during turning of the shaft in opposite directions.

10. The combination of, a hydrofoil having laterally spaced supporting legs and a shaft rigidly spanning said legs, a support attachable to the stern of a boat, a member mounted on said support to swing about an upright axis disposed adjacent the outer end of the boat stern, a bearing on said member adjacent said axis supporting one end portion of the shaft to swing substantially through a half revolution about a horizontal axis between an active submerged position and an upright out of the water position, a second bearing on said support alined with said first bearing and engageable with the other end portion of said shaft, and means holding said shaft in said second bearing and releasable to permit swinging of the shaft about said upright axis and around the outer end of the boat stern to a position along one side of the boat.

11. The combination of, a hydrofoil, a support attachable to the stern of a boat, a member mounted on said support to swing about an upright axis disposed adjacent the outer end of the boat stern, and means on said member supporting said hydrofoil to swing substantially through a half revolution about a horizontal axis between an active submerged position and an upright out of the water position, said member being swingable substantially through a quarter revolution to move said hydrofoil from a position behind said boat stern to a second position along one side of the boat.

12. The combination of, a hydrofoil having two upright laterally spaced legs and a connecting part of foil cross-section, a shaft spanning the upper ends of said legs, a support attachable to a boat, and means on said support pivotally supporting said shaft and hydrofoil to swing about an axis extending longitudinally of the shaft and also about an axis perpendicular to said first axis.

13. The combination of, a support adapted to be attached to a boat, a lever pivoted intermediate its ends on said support to swing about a horizontal axis extending transversely of the boat to which said support is attached, a hydrofoil rigidly attached to said one end of said lever, a horizontal cross-shaft paralleling said axis and journaled on said support, a crank rigid with said shaft, a link connected to said crank at one end, a pivot joining the other end of said link to the other end of said lever for swinging of the latter with said crank to move said hydrofoil about said axis into and out of a submerged substantially vertical position, the axis of said shaft being disposed between said pivot and the fulcrum of said lever and near a plane including the fulcrum and pivot whereby to reduce the ratio of motion transmission between said shaft hydrofoil as the latter is swung toward such vertical position, and means movably mounted on said support for rocking said cross-shaft back and forth.

14. The combination of, a support adapted to be attached to a boat, a lever pivoted intermediate its ends on said support to swing about a horizontal axis extending transversely of the boat to which said support is attached, a hydrofoil rigidly attached to said one end of said lever, a horizontal cross-shaft paralleling said axis and journaled on said support, a connection transmitting the motion of said shaft to said lever to swing said hydrofoil into and out of the water to and from a submerged substantially vertical position, said connection including means for reducing the ratio of motion transmission to a substantially constant value when the hydrofoil is adjacent said submerged position, and means movably mounted on said support for rocking said shaft back and forth.

15. The combination of, a support adapted to be attached to a boat, a hydrofoil, means on said support mounting said hydrofoil to swing about a horizontal axis, a horizontal cross-shaft paralleling said axis and journaled on said support, a crank rigid with said shaft, means including a link joined to said crank, a pivot connecting said link and said hydrofoil to swing the latter about said axis into and out of a submerged substantially vertical position, said pivot and the axes of said hydrofoil and said cross-shaft lying substantially in a common plane whereby to provide a low ratio of transmission of the motion of said cross-shaft to said hydrofoil, said link and crank moving to increase the ratio of motion transmission progressively when the hydrofoil is swung away from said submerged position, and an operating shaft journalled on said support and having an operative connection with said cross-shaft.

16. The combination of, a support adapted to be attached to a boat, a hydrofoil mounted on said support to swing about a horizontal axis into and out of an active submerged position, a horizontal cross-shaft paralleling said axis and journaled on said support, manually operable means for rocking said cross-shaft back and forth to move said hydrofoil into and out of the water to and from said active position, and a connection between said cross-shaft and said hydrofoil operable to transmit the rocking motion of said cross-shaft to said hydrofoil at a relatively high ratio when the hydrofoil is spaced from said active position and at a low ratio when the hydrofoil is near such position whereby to enable the angle of attack of the hydrofoil to be adjusted in fine increments by said manually operable means.

17. The combination of, a support attachable to a boat, a member mounted on said support to swing about a generally horizontal axis extending transversely of the boat to which said support is attached, a hydrofoil fixed to said member and swingable therewith between an active submerged position and an out of the water position, a rotary upright shaft journaled on said support, and mechanism connecting said shaft and said member to effect rapid movement of said hydrofoil into and out of the water and fine graduated adjustment of the angle of attack of the hydrofoil when the latter is disposed in said active position.

18. The combination of, a support adapted to be attached to the bow of a boat, an elongated upright bearing, a tubular shaft journaled in said bearing and projecting from the lower end thereof, a gear casing fast on the lower end of said shaft, bell cranks disposed on opposite sides of said casing and pivoted thereon to swing about a horizontal axis spaced forwardly from the axis of said shaft, a V-shaped hydrofoil having a bar spanning and rigid with the legs of the V, means rigidly securing said bar to said bell cranks at points offset from said pivots, a horizontal cross-shaft projecting through said casing, crank arms rigid with said cross-shaft, links connecting said arms and said bell cranks for swinging of the latter to move said hydrofoil about said pivots through substantially a half revolution into and out of a submerged upright position, an operating shaft extending through and journaled in said tubular shaft, and gearing within said casing connecting said operating and cross-shaft.

19. The combination of, a support adapted to be attached to a boat and having an elongated upright bearing, a hydrofoil having laterally spaced legs and a crossbar rigidly spanning the legs, a tubular shaft journaled in said bearing, means on the lower end of said shaft supporting said crossbar for swinging of the hydrofoil about horizontal and upright axes, steering mechanism operable from a point within said boat to swing said foil about said upright axis, an operating shaft extending through said tubular shaft, and means connecting said operating shaft and said hydrofoil to swing the latter about said horizontal axis.

20. The combination of, a support adapted to be attached to a boat and providing an upright bearing, a tube journaled in said bearing, a horizontal cross-shaft journaled on and extending transversely of the lower end portion of said tube, a hydrofoil mounted on the lower end of said tube to swing about an axis paralleling said shaft, means including a crank on said shaft for rocking said hydrofoil during turning of the shaft back and forth, an operating shaft journaled in and extending through said tube, and means connecting said cross and operating shafts to rock said hydrofoil in accordance with the turning of the operating shaft.

21. The combination of, a support adapted to be attached to the bow of a boat, a V-shaped hydrofoil having a crossbar rigidly spanning the legs of the V, means on said support mounting said crossbar for swinging of the hydrofoil about horizontal and upright axes, and steering mechanism connected to opposite end portions of said crossbar and operable from a point within said boat.

22. The combination of, a support attachable to the hull of a boat, a member mounted on said support to swing about an upright steering axis, a hydrofoil, means on said member pivotally supporting said hydrofoil to swing about a generally horizontal axis offset from and disposed behind said upright axis, steering mechanism by which said member may be swung about said upright axis, and means for rocking said member about said horizontal axis to swing said hydrofoil between an active submerged position and an out of the water position.

23. The combination of, a support attachable to the bow of a boat, an upright bearing suspended from said support to swing about a horizontal axis, a shaft journaled in said bearing and projecting therethrough, a hydrofoil, means on the lower end of said shaft supporting said hydrofoil to swing about a second horizontal axis between submerged and out of the water positions, steering mechanism for turning said shaft to swing said hydrofoil about the axis of said bearing into and out of a straight ahead position, and a link connecting said support and said bearing and operable during turning of the shaft in either direction away from said straight ahead position to swing said bearing about said first axis in a direction to decrease the effective angle of attack of said hydrofoil.

24. The combination of, a support adapted to be attached to the bow of a boat, a member journaled on said support to turn about an upright axis, a hydrofoil, means on said member supporting said hydrofoil to swing about a horizontal axis to vary the angle of attack of the hydrofoil, steering mechanism for turning said member in opposite directions away from a straight ahead position, and mechanism connecting said member and said support and operable to swing said hydrofoil about said axis and decrease the angle of attack of the hydrofoil progressively during swinging of the hydrofoil about said upright axis in either direction away from said straight ahead position.

25. The combination of, a support attachable to a boat, a member mounted on said support to swing about a generally horizontal axis extending transversely of the boat to which said support is attached, a hydrofoil fixed to said member and swingable therewith between an active submerged position and an out of the water position, a contractile spring stretched between said support and said member and acting along a line disposed adjacent said axis when said hydrofoil is in said submerged position and movable laterally away from the axis as the hydrofoil is swung to a generally horizontal position.

26. The combination of, a support attachable to a boat, a member mounted on said support to swing about a generally horizontal axis extending transversely of the boat to which said support is attached, a hydrofoil fixed to said member and swingable therewith between an active submerged position and an out of the water position, and counterbalancing means mounted on said support and acting on said member to exert a counterbalancing force which increases progressively as said hydrofoil moves away from said submerged position toward an out of the water position.

27. The combination of, a boat having a support extending transversely of the boat, a plurality of hydrofoils each having laterally spaced legs and means including a shaft spanning and rigidly connecting the same, brackets secured to said support and laterally spaced apart transversely of the boat, and bearings on said brackets rotatably supporting said shafts on horizontal axes extending transversely of said boat whereby to permit swinging of the hydrofoils into and out of the water to and from an active position in which the submerged foil surfaces are positioned to move edgewise through the water.

28. The combination of, a support attachable to a boat, a hydrofoil of foil cross section mounted on said support and having laterally spaced sides converging downwardly to an apex to impart dihedral angles greater than 35 degrees to the submerged portions of the hydrofoil, the submerged part of said foil section being formed by upper and lower surfaces converging along circular arcs over the major portion of the width of the foil and terminating in a leading edge which is less slender than the intersection of such arcs.

29. The combination of, a support attachable to a boat, a V-shaped hydrofoil of foil cross section, and means mounted on said support and rigidly spanning the legs of the V, the apex of the V being bent around a radius equal approximately to three-quarters of the chord through the leading and trailing edges of the foil section.

30. The combination of a boat and a hydrofoil system attached thereto for lifting and supporting said boat above the water while in forward motion, said system having, in combination, three hydrofoil units each comprising a bar of foil cross section and V-shape with the apex of the V disposed below the bottom of the boat and the legs of the V diverging upwardly from the apex, a support attached to the boat near the bow thereof, means on said support mounting one of said units to turn about an upright axis substantially intersecting the longitudinal center line of the boat and with the apex disposed below the bottom of the boat and the legs of the V diverging upwardly from said apex on opposite sides of said bow, an actuator operable from a point within the boat to swing said front hydrofoil unit about said upright axis to steer the boat, and means attached near the stern of said boat and supporting the other two hydrofoil units with the apices thereof spaced outwardly and laterally from said stern.

31. The combination of a boat and a hydrofoil system attached thereto for lifting and supporting said boat above the water while in forward motion, said system including at least one forward hyrofoil unit comprising a bar of V-shape with the apex of the V disposed below the bottom of the boat and the legs of the V diverging upwardly from the apex, a cross member rigidly spanning said legs near the upper ends thereof, a support attached to the boat near the bow thereof, means on said support pivotally mounting said cross member to turn about an upright axis and a horizontal axis respectively extending transversely of and along said cross member, an actuating connection extending into the boat and operable to swing said hydrofoil about said upright axis to steer the boat, and an actuator for swinging said hydrofoil about said horizontal axis.

32. The combination of a boat and a hydrofoil system attached thereto for lifting and supporting said boat above the water while in forward motion, said system including a forward hydrofoil unit comprising a bar of foil cross section and V-shape with the apex of the V disposed below the bottom of the boat and the legs of the V diverging upwardly from the apex, a cross member rigidly spanning said legs near the upper ends thereof, a support attached to the boat near the bow thereof, means on said support pivotally mounting said cross member to turn about an upright axis extending transversely of said cross member, said hydrofoil having a dihedral angle of more than thirty-five degrees over the major portion of the horizontal projection of its active submerged area, and an actuating connection extending into the boat and operable to swing said hydrofoil about said upright axis to steer the boat.

33. The combination of a boat and a hydrofoil system attached thereto for lifting and supporting said boat above the water while in forward motion, said system including a forward hydrofoil unit comprising a bar of foil cross section and V-shape with the apex of the V disposed below the bottom of the boat and the legs of the V diverging upwardly from the apex, a cross member rigidly spanning said legs near the upper ends thereof, a support attached to the boat near the bow thereof, means on said support pivotally mounting said cross member to turn about an upright axis extending transversely of said cross member, and an actuating connection extending into the boat and operable to swing said hydrofoil about said upright axis to steer the boat.

34. The combination as defined by claim 4 including a ratchet wheel and a pawl respectively coupled to said support and said hydrofoil and acting when engaged to prevent swinging of the hydrofoil toward said stop.

35. The combination of, a boat, a hydrofoil unit, a support attachable to said boat, means on said support rotatably supporting said hydrofoil to swing into and out of an active submerged position about an axis extending transversely of the boat, a stop engageable with said hydrofoil to determine said active position and the angle of attack of the hydrofoil, and means releasably engageable with a part of said hydrofoil unit to hold the hydrofoil in said active position against said stop, said hydrofoil unit comprising two parts joined together by a coupling adapted to yield and permit independent fore and aft swinging of the submerged hydrofoil about an axis extending transversely of the boat, said coupling exerting a resisting moment of sufficient magnitude to maintain the submerged position of the hydrofoil until an obstruction is encountered thereby.

36. The combination of a boat and a hydrofoil system therefor having, in combination, two separate hydrofoil units each including foil elements disposed in a V-shape with the legs of the V diverging upwardly from the apex thereof, means attached to said boat and rigidly supporting said units with the apices of the two V's spaced outwardly from the center line of the boat, each of said two units having a horizontal projected area below the level of the bottom of the boat of which area more than one-half thereof is disposed at a dihedral angle of more than 35 degrees, and at least one additional hydrofoil unit spaced longitudinally along the boat from said two units and coacting therewith to lift the boat above the water while in forward motion and provide widely spaced multiple points of support while the boat is foil borne, and means attached to the boat and supporting said additional unit to turn about an upright axis for steering the boat.

37. The combination of a boat and a hydrofoil system therefor having, in combination, two separate hydrofoil units each including elements of foil cross section disposed in a V-shape with the legs of the V diverging upward from the apex thereof, means attached to said boat and rigidly supporting said units with the apices of the two V's spaced outwardly from the center plane of the boat at least as far as the floating stationary water line thereof as measured in a transverse plane intersecting said units, at least one additional V-shaped hydrofoil unit spaced longitudinally of the boat from said two units so as to coact therewith in lifting the boat out of the water while in forward motion and provide widely spaced multiple points of support while the boat is foil borne, and means attached to the boat supporting said additional V-shaped unit to turn about an upright axis whereby to provide for steering the boat by turning such unit about such axis.

38. The combination of a boat and a hydrofoil system therefor having, in combination, two separate hydrofoils each including elements of foil cross section forming a V with the legs of the V diverging upwardly from the apex thereof and providing a lifting area the major portion of which is disposed at an acute high dihedral angle of more than 35 degrees, the cross section of the high dihedral portions of each hydrofoil comprising upper and lower lines lying substantially on and following outwardly along shallow intersecting circular arcs over a major portion of the width of the hydrofoil and, near the leading edge of such foil, converging more sharply than said arcs into mergence with each other whereby to dispose the leading edge of said foil within said arcs and space the same short of the point of intersection of said arcs a distance equal to at least 1/20 of said foil width, means rigidly attaching the legs of each of said two hydrofoils to said boat with the apices of the V's spaced outwardly from the longitudinal center line of the boat, and an additional hydrofoil mounted on said boat and spaced longitudinally of the boat from said two hydrofoils and coacting therewith to lift the boat above the water while the boat is moving forwardly.

39. The combination defined by claim 38 in which said high dihedral angle is approximately 42 degrees.

References Cited in the file of this patent

UNITED STATES PATENTS

| | | |
|---|---|---|
| 811,743 | Reeve | Feb. 6, 1906 |
| 909,468 | Simpson | Jan. 12, 1909 |
| 1,024,067 | Forlanini | Apr. 23, 1912 |
| 1,084,578 | Hewitt | Jan. 13, 1914 |
| 1,088,226 | Hewitt | Feb. 24, 1914 |
| 1,976,046 | Tietjens | Oct. 9, 1934 |
| 2,042,598 | Harvey | June 2, 1936 |
| 2,257,406 | Von Burtenbach | Sept. 30, 1941 |
| 2,584,347 | Hazard | Feb. 5, 1952 |
| 2,597,048 | Almquist | May 20, 1952 |

FOREIGN PATENTS

| | | |
|---|---|---|
| 420,825 | Italy | May 6, 1947 |
| 517,519 | Germany | Feb. 4, 1931 |
| 715,558 | France | Sept. 28, 1931 |
| 959,264 | France | Sept. 26, 1949 |